United States Patent Office 3,099,625
Patented July 30, 1963

3,099,625
BLEACHING AND DETERGENT COMPOSITION
AND PROCESS OF USING SAME
Domenick D. Gagliardi, East Greenwich, R.I., and
Mark W. Pollock, Bronx, N.Y., assignors to Argus
Chemical Corporation, Brooklyn, N.Y., a corporation
of New York
No Drawing. Filed June 23, 1960, Ser. No. 38,117
17 Claims. (Cl. 252—98)

This invention relates to an improved process for bleaching textiles carrying an organic polymer having NH groups in the presence of a chlorine acceptor which prevents conversion thereof to N—Cl groups, and to chlorine-containing bleaching compositions and to detergent compositions containing such acceptors and useful in this process.

In recent years, there have been made available a wide variety of textile materials which are crease-proofed with the aid of synthetic polymeric materials. The textiles are impregnated or otherwise treated with these resinous materials. In many cases, the resulting textiles are washable, and such textiles are now quite generally referred to as "wash-and-wear" textiles or fabrics.

The synthetic polymers commonly used for this purpose contain a significant proportion of NH groups in the resin molecule, either in a straight chain or in a cyclic structure. Typical polymers of these types include the polyamides, such as nylon, polyacrylonitrile, melamine-formaldehyde resins, open-chain urea-formaldehyde resins and cyclic urea-formaldehyde resins. However, these polymers are so sensitive to hypochlorite that they are usually sold with instructions that they are not to be used with such bleaches. The bleaching of textiles treated with these resins thus has presented a serious problem.

After an almost predictable number of washings, the fabric will acquire a yellowish color, and will then develop holes or even disintegrate when subjected to high temperature, as in a dryer or during ironing. Apparently, the hypochlorite attacks the NH groups on the polymer molecule, and converts these to N—Cl groups, which are retained during subsequent washings. When N—Cl groups are heated to a sufficiently high temperature, HCl is liberated, and this scorches the fabric and attacks the textile. After a sufficient number of N—Cl groups have been formed in this way, it is quite easy for the fabric to become severely damaged when heated.

It has been proposed that this problem could be overcome by using polymers containing N-substituted groups, such as the N-substituted cyclic ureas, thus eliminating free NH groups. However, it is very difficult to effect complete replacement of hydrogen in NH groups, and cyclization in the cyclic ureas may not be complete. Thus, some NH groups almost invariably remain, which can react with the hypochlorite bleach to produce N—Cl groups. Also, cyclic ureas are sensitive to alkaline hydrolysis, which can take place in the bleaching solution, opening the ring and thus forming NH groups, which then react to form N—Cl groups. After about twenty washings, fabrics crease-proofed with polymeric cyclic ureas are no more resistant to the action of hypochlorite bleach than are open chain urea-formaldehyde resins.

The problem can be avoided if non-chlorine-containing bleaches are used, or if the bleaching compound is sufficiently unreactive so it does not form N—Cl groups. In the latter case, however, the bleaching effect is not as great as might be desirable. In the former, the expense of the bleaching is considerably increased because such bleaches are more expensive than hypochlorites.

These problems are avoided, in accordance with the invention, by effecting the bleaching in the presence of a nitrogenous organic compound having in the molecule at least one NH group whose hydrogen atom is labile, and readily replaced by chlorine. This compound is referred to from time to time hereinafter as the chlorine acceptor.

It is theorized, but without any substantiating experimental evidence, that the formation of N—Cl groups in the resulting competitive reaction between the NH groups on the textile and the NH groups on the nitrogenous compound is thus almost entirely restricted to the latter, since the latter is the more reactive. The former then react only to a negligible extent with each bleaching cycle.

Since the organic nitrogenous compound is present throughout the bleaching bath, being uniformly dispersed or dissolved therein, its NH gorups are of course more available for reaction with the bleach than are the resin NH groups. However, it is probable that only the molecules of the nitrogenous compound in the immediate vicinity of the textile should be considered as taking part in the competitive reaction with the hypochlorite bleach, vis-a-vis the NH groups on the polymer. Whatever the mechanism, the result is substantially complete protection of the textile from the deleterious action of the hypochlorite bleach.

The invention is effective to protect any natural and synthetic fibrous material sensitive to chlorination or oxidation, and particularly to protect the NH-containing resinous material applied to fibrous materials for the purpose of crease proofing, or other effects. Typical fibrous materials of which the textiles may be formed in whole or in part are wool, cotton, silk, ramie, nylon, polyurethane, viscose rayon, acetate rayon, zein, casein, hemp, alginates, linen, sisal, maguey and jute. Resinous materials containing NH groups include, for example, urea-formaldehyde resins, melamine-formaldehyde resins, triazine-formaldehyde resins, pyrimidone-formaldehyde resins, ethylene urea-formaldehyde resins, guanidine-formaldehyde resins, sulfonamide-formaldehyde resins, triazone-formaldehyde resins, dicyandiamide-formaldehyde and carbamate-formaldehyde resins.

The textile material can be treated in any form, woven and unwoven, as bats, felts, fibers, yarn, roving, sliver, and fabrics of all sorts. All such are referred to collectively herein as "textiles."

The amount of the organic nitrogenous compound is determined by the amount of NH-containing natural or synthetic polymer present, as fibrous material and/or as a finish thereon. The chlorine acceptor should supply at least one mole of NH groups per mole of NH groups present on the textile. This may be difficult to estimate, but an excess does no harm. Therefore, more can be used to provide a safe margin, up to about 5 moles per mole. Even more than this can be used, but will give no better result, in most instances, and will therefore be wasteful.

Ordinarily, textiles are crease-proofed with from about 0.25 to about 10% of an organic synthetic polymer. Therefore, at normal washing concentrations and with normal weights of goods being washed if the textile does not contain NH groups it is usually adequate to carry out the bleaching operation in the presence of a proportionate amount of the organic nitrogenous compound, within the range from about 50 to about 250% by weight of the available chlorine, preferably from 75 to 150%. Such amounts provide a safe margin of chlorine acceptor, in most cases. Proportionately more would be used if NH groups are present in the fibrous material.

A great variety of organic nitrogenous compounds can be employed. Any organic compound dispersible or soluble in the bleaching bath and having an NH group whose hydrogen is sufficiently labile to be reactive with chlorine under the bleaching conditions to form an N—Cl group can be employed in the process of the invention. It is preferred that the NH groups of the compound be more reactive with chlorine than the NH groups on the polymer, but a relatively slow rate of reaction, or low reactivity, compared to the polymer, can be compensated for by adding more of the compound.

The compounds of the invention can have an open chain or cyclic structure, which can be saturated, unsaturated or aromatic.

In the preferred compounds, the NH group is adjacent a carbonyl C=O, thiocarbonyl C=S, imino C=NH, thiono S=O or phosphoro P=O group, and forms a linking nucleus of one of these types:

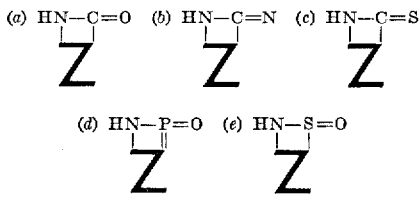

The free valences on the nucleus are satisfied by the radical Z, which can be one, two or three radicals, depending on the valence of the radical, taken in sufficient number to satisfy the valences of the linking nucleus, including groups forming a heterocyclic ring with the linking nucleus. Preferably, Z is selected from the group of monovalent, bivalent and trivalent radicals consisting of hydrogen, alkyl, alkylene, aryl, amino and saturated and unsaturated mono- and polynuclear alicyclic and heterocyclic rings condensed therewith, having from one to about thirty carbon atoms, all of which may bear heterocyclic atoms such as oxygen, nitrogen and sulfur and substituents such as hydroxyl, halogen, amino, alkyl and aryl groups.

Typical Z groups are methyl, ethyl, amyl, ethylene, propylene, butylene, 2-ethyl hexyl, dodecyl, isobutyl, $NH_2$-, t-butyl, phenyl, benzyl, xylyl, tolyl, cyclohexyl, naphthyl, pyridyl, —$CH_2CH_2$—O—$CH_2$—

—$CH_2$—NH—$CH_2$— and —$CH_2$—S—$CH_2$—.

Exemplary of compounds coming within the invention are melamine, guanine, benzoguanamine, hydroxy ethylene urea, guanazole, 1-keto-4-methyl-tetrahydro triazine-2,4,6, urea, ethylene urea, ethylene diurea, ethylene thiourea, guanidine, dimethyl glycouril, thiourea, acetylene diurea, benzamide, thiohydantoin, dimethyl hydantoin, hydantoin, thiouracil, acetamidine, formamidine, uracil, methyl uracil, methyl thiourea, caprylyl hydroxamic acid, benzolyene thiourea, thiourazole, creatinine, semicarbazide, allanturic acid, allantoin, alloxan, tetrazole, d-tetrazine, s-tetrazine, 6-propyl thiouracil, dialuric acid, violuric acid, diethyl barbituric acid, oxalyl urea, oxaluric acid, lactyl urea, allophanic acid, diethyl urea, phosphamide, sulfamide, benzene sulfonamide acetamide, butyl acetamide, butyramide, propionamide, formamide, sulfanilamide, toluene sulfonamide, methyl phosphonamide, benzene phosphonamide, diacetamide and valeramide. In general, the organic nitrogenous compound will have from one to nine carbon atoms and from one to ten NH groups in at least one of the above linking nuclei.

Amino compounds do not have a labile hydrogen, and are ineffective in the compositions of the invention. Nitrogen-containing compounds in which the NH group is not adjacent to a carbonyl, thiocarbonyl, imino, phosphoro or thiono group are usually weak chlorine acceptors.

These nitrogenous compounds serve as chlorine acceptors for the protection of NH-containing polymers in the presence of any hypochlorite bleaching agent. These bleaching agents are well known, and commonly available. They include sodium, potassium, and calcium hypochlorite. The acceptors are also effective in the presence of free chlorine.

The chlorine acceptor can be incorporated directly in the bleaching bath or in the anhydrous bleaching composition. The acceptors of the invention are stable in the presence of the hypochlorite bleach in the absence of appreciable amounts of water. In the presence of sufficient water, N—Cl groups may be formed, diminishing or destroying the effectiveness of the acceptor. Dry powdered bleaching compositions can be prepared and the acceptors of the invention are readily incorporated in such mixtures by conventional methods, such as by simple mixing of the dry ingredients. If, however, the bleach is prepared in aqueous solution it is preferable to package the chlorine acceptor of the invention in a separate package, for addition to the bleaching bath at the time of use. Compartmented packages are readily devised to meet the need to supply prescribed amounts of the acceptor. A supply of capsules or tablets of the acceptor can, for example, be included in the package with the bleaching composition, one or more tablets to be added to each bath, depending upon the amount of bleach that is added. Compartmented packages enclosed by materials soluble in the bleaching or washing bath can be used, containing the correct amount of each ingredient for one wash or bleach in an automatic washer, for example.

Many housewives today carry out the bleaching operation in the presence of a detergent, to obtain the beneficial effects of the detergent to remove grime, and thus enhance the bleaching effect. The chlorine acceptors of the invention can be incorporated in detergent compositions of conventional type, in which event they will be made available in the bath at the time of bleaching. Detergent formulations of both the soap and nonsoap types are now being marketed in the form of spray dried powders, chips, flakes and pellets, and the acceptors of the invention can be included in any of these. The acceptors are not reactive with any of the conventional components of synthetic detergent formulations.

Quite large amounts of chlorine acceptor are required, to supply enough NH groups per unit weight of detergent used in a wash-and-bleach operation. At least 7.5% by weight of the detergent composition is necessary to obtain a noticeable lessening in attack on the fabric, and preferably 10% or more is used.

Some soap and nonsoap detergent formulations are mixed with inorganic phosphate builders. Such compositions are known as "built" detergents and contain a soap or nonsoap of conventional type and a polyphosphate. The acceptors of the invention are easily incorporated in such mixtures, also.

In many cases synthetic detergents and soap formulations are prepared by blending the componds thereof in an aqueous solution or slurry and then drying the resulting mixture in a spray or drum dryer at elevated temperatures. The acceptors of the invention are conveniently mixed with other components in such media and processed in the usual manner. Formulations are also prepared by dry mixing of the ingredients.

The soaps can be any of the well known water-soluble alkali metal soaps of higher fatty acids having from about 8 to about 24 carbon atoms, such as sodium, potassium, and ammonium soaps of caprylic, lauric, myristic, palmitic, oleic, ricinoleic, linoleic, stearic, margaric, and behenic acids. These acids are frequently used in the form of the fatty acid mixtures obtained by hydrolysis of natural fatty glycerides such as the mixtures of fatty acids obtained by the hydrolysis of corn oil, beef tallow, sheep tallow, coconut oil, palm oil, cottonseed oil and lard.

The synthetic detergent can be any of the known synthetic detergents, or a mixture thereof, including the anionic, cationic and nonionic detergents. Both the soap and nonsoap detergent formulations will contain conventional proportions by weight of the detergent, usually within the range from 5 to about 40%. A built detergent composition will also contain an alkali metal polyphosphate in any desired amount, usually between 5 and 50%. The balance of the formulation will be supplemental builders and inert materials.

The following are exemplary of synthetic detergents.

The alkyl aryl sulfonates are a class of anionic detergents well known in the art under this name. One example thereof are the sulfonated phenyl polypropylene alkanes, characterized by the branched chain structure of polypropylene and tertiary alkyl carbon at the benzene ring, and having the following general structure.

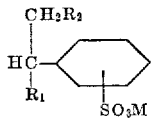

where M is hydrogen, an alkali metal or an organic amine cation, $R_1$ and $R_2$ are alkyl, of the type formula $C_nH_{2n+1}$, and at least one R is a polypropylene group, the whole alkyl group containing preferably 12 to 15 carbon atoms. These are known compounds, whose preparation and properties are set forth in U.S. Patent No. 2,477,383, to Lewis, issued July 26, 1949; they are available in commerce under the trade names "Oronite," "Ultrawet," and "Neolene."

Other water-soluble alkyl aromatic sulfonic acids include those prepared by alkylating benzene or naphthalene with a kerosene fraction, followed by sulfonation to aromatic sulfonic acids.

Another class of useful nonsoap detergents are the amidoalkane sulfonates, which are characterized by the following structure:

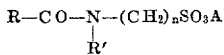

where A is hydrogen or an alkali metal, i.e., ammonium, sodium or potassium, $n$ is a small whole number from 1 to about 5, preferably 2 or 3, R' is hydrogen or an alkyl, aryl, or cycloaliphatic group, such as methyl, and R is an alkyl or alkylene radical, such as myristyl, palmityl, oleyl and stearyl. Sodium palmitic tauride, sodium palmitic methyl tauride, sodium myristic methyl tauride, sodium palmitic-stearic methyl tauride and sodium palmitic methyl amidopropane sulfonate are typical examples thereof.

These compounds are prepared by interacting the corresponding aliphatic acid anhydride or halide with an organic aliphatic aminosulfonic acid, such as taurine, $NH_2CH_2CH_2SO_3H$, and various N-substituted taurines, such as N-methyl taurine or aminopropane sulfonic acid, $NH_2(CH_2)_3SO_3H$.

Other anionic detergents includes esters of sulfuric acid with aliphatic alcohols of 10 to 18 carbon atoms, particularly those derived by the reduction of the fatty acids derived from coconut oil, palm oil and the like long-chain fatty acids, sulfonated castor oil, esters and ethers of isethionic acid, long-chain fatty acid esters and long-chain alkyl ethers of 2,3-dihydroxy-propane sulfonic acid and sulfuric acid esters of monoglycerides and glycerol monoethers.

Examples of organic nonionic nonsoap detergents include alkyl oxyether and ester and thioether and ester detergents having the following general formula:

$$R\text{—}A\text{—}(CH_2CH_2O)_x\text{—}CH_2CH_2OH$$

where R is a straight or branched chain saturated or unsaturated hydrocarbon group having from 8 to 18 carbon atoms, or an aralkyl group having a straight or branched chain saturated or unsaturated hydrocarbon group of from 8 to 18 carbon atoms attached to the aryl nucleus, and attached to A through the aryl nucleus, A is selected from the group consisting of ethereal oxygen and sulfur, carboxylic ester and thiocarboxylic ester groups and $x$ is a number from 8 to 20. R can, for example, be a straight or branched chain octyl, nonyl, decyl, lauryl, myristyl, cetyl, or stearyl group, or an alkylaryl group such as octylphenyl, nonylphenyl, decylphenyl, stearylphenyl, etc.

The sulfated ethoxylated derivatives of the above also are useful anionic detergents:

$$R\text{—}A\text{—}(CH_2CH_2O)_x\text{—}CH_2CH_2OSO_3M$$

where M is hydrogen or an alkali metal or an organic amine-cation and $x$, A and R are as above.

Where R is alkyl it will be evident that the detergent can be regarded as derived from an alcohol, mercaptan, oxy or thio fatty acid of high molecular weight, by condensation with ethylene oxide. Typical of this type of alkyl ether are the condensation products of oleyl or dodecyl alcohol or mercaptan with from 8 to 17 moles of ethylene oxide such as "Emulfor ON." Typical alkyl esters are "Renex" (polyoxyethylene ester of tall oil acids) and "Neutronyl 331" (higher fatty acid ester of polyethylene glycol).

Where R is aralykyl, the detergent can be derived from an alkyl phenol or thiophenol.

The ethoxylated alkyl phenols and thiophenols have the following general formula:

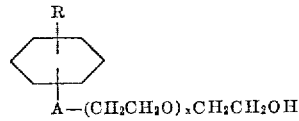

where R is a straight or branched chain saturated or unsaturated hydrocarbon group having at least 8 carbon atoms up to approximately 18 carbon atoms, A is oxygen or sulfur, $x$ is a number from 8 to 20. R can, for example, be a straight or branched chain octyl, nonyl, decyl, lauryl, cetyl, myristyl or stearyl group. Typical are the condensation products of octyl and nonyl phenol and thiophenol with from 8 to 17 moles of ethylene oxide, available commercially under the trade name "Igepal CA."

Typical cationic detergents are the higher fatty acid esters of hydroxy amide quaternary salts, such as the lauric ester of N($\beta$-hydrovyethyl-$\alpha$-chloropyridinium) acetamide, the quaternary ammonium salt type, such as triamylbutyl ammonium cymene sulfonate, dimethyl phenyl benzyl ammonium salt of dibutylnaphthalene sulfonic acid, trimethyl heptyl ammonium salt of sulfated butyl oleate, octadecyl trimethyl ammonium chloride, straight chain fatty amines of eight to eighteen carbon atoms, such as stearylamine, dilauryl amine, lauryl di-(hydroxy ethyl)amine, the polyamines made from the reduction of polymerized unsaturated fatty nitriles, i.e., the polymerized nitrile of linseed oil fatty acids, and the quaternary compounds from alkyl halides and hexamethylene tetramine, the reaction products of $\alpha$-halogenated fatty acid anilides or esters such $\alpha$-chloro-stearic anilide or $\alpha$-bromo-stearic ethyl ester with tertiary amines such as trimethyl amine, reaction products of long chain alkyl phenols with amines and aldehydes, such as the reaction product of p-t-octylphenol with formaldehyde and dimethylamine, which products may also be quaternized, such as

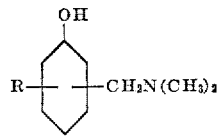

and

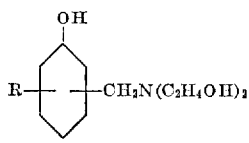

where R is an alkyl group of six to eighteen carbon atoms, the amidoalkylene amines

RCONHCH$_2$CH$_2$N—R$_1$R$_2$ where R is an alkyl group of six to eighteen carbon atoms and R$_1$ and R$_2$ are alkyl or hydroxyalkyl groups of one to five carbon atoms (the Sapamines), the amidoalkylene quaternary ammonium salts

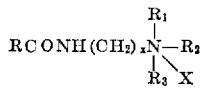

where R is as above, R$_1$, R$_2$ and R$_3$ are alkyl or aryl or alkaryl, and X is an anion such as halide, alkyl ether amines of the type ROCH$_2$NR$_1$R$_2$ and their quaternary ammonium salts ROCH$_2$NR$_1$R$_2$R$_3$X, where R, R$_1$, R$_2$, R$_3$ and X are as above, the corresponding thio ethers RSCH$_2$NR$_1$R$_2$ and RSCH$_2$NR$_1$R$_2$R$_3$X, the long chain alkyl sulfonium compounds of the type

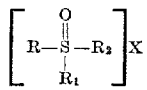

where R, R$_1$, R$_2$ and X are as above; such as cetyl methyl ethyl sulfonium bromide, and amido sulfonium salts of the type

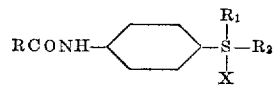

where R, R$_1$, R$_2$ and X are as above, and the Victamines

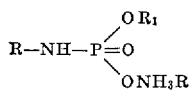

where R and R$_1$ are as above, such as that made from stearylamine and ethyl metaphosphate:

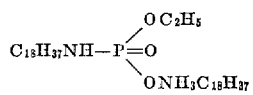

The optional supplemental builders may be alkali metal inorganic salts, typical examples of which include sodium and potassium sulfates, sodium and potassium chlorides, sodium and potassium silicates and sodium and potassium carbonates.

In addition to or instead of the above mentioned supplemental inorganic salts, organic materials such as sodium carboxymethylcellulose can be used as builders.

The builder mixture is so chosen among alkaline, neutral or acidic salts that the composition obtained in an aqueous 0.14% washing solution has a pH of 7 or above. Preferably its pH lies within the range of 7 to about 11, since solutions which are more alkaline may be irritating to the skin and tend to weaken some fabrics, particularly woolens. In general, the alkali metal carbonates are preferred agents for bringing the pH of the solution to a high alkaline value within the preferred range.

The following examples, in the opinion of the inventors, represent the best embodiments of their invention.

EXAMPLE I

A series of washings were carried out on an 80 x 80 white desized and bleached cotton fabric which had been crease-proofed with a methylated urea-formaldehyde resin. The cloth was padded with an aqueous bath of 8% methylated urea-formaldehyde resin and 0.9% magnesium chloride hexahydrate. The resin was applied in a laboratory padder, with one dip and one nip, at an 80% wet pick up. The fabric was then frame dried and cured in one operation at 300° F. for ten minutes. The resulting fabric was then tested by the AATCC accelerated chlorine damage test No. 92–1958 with and without various chlorine acceptors. The tensile strength of the fabrics tested was determined before and after the washings. The samples were air dried after washing for four hours at room temperature, and then pressed on a flat bed ironer, cotton setting, for 30 seconds. The following results were obtained:

Table I

| Chlorine Acceptor Added to NaOCl [1] | Percent [2] |
|---|---|
| None | 0 |
| Dimethyl hydantoin | 45 |
| Acetylene diurea | 49 |
| Urea | 91 |
| Melamine | 94 |

[1] One molar equivalent of NH groups present in the chlorine acceptor for each molar equivalent NaOCl.
[2] Percent strength retained after bleach and scorch.

It is apparent that the four acceptors tested gave considerable protection against the loss of strength during the bleaching operation. The best compounds tested were urea and melamine. The other compounds would have been more effective if used in a larger amount.

EXAMPLE II

A resin-impregnated cotton fabric was prepared from an 80 x 80 white desized and bleached cotton print cloth, using an aqueous padding bath containing 8% methylated melamine formaldehyde resin and 1.9% magnesium chloride hexahydrate. The resin was applied using a laboratory padder, one dip and one nip, at 80% wet pick up. The impregnated samples were frame dried and cured in one operation at 300° F. for ten minutes. The effectiveness of various nitrogenous chlorine acceptors in preventing the yellowing and scorching of the fabric was determined using the AATCC test measuring whiteness of the fabric against the control. The results are reproduced in Table II below:

Table II

| Chlorine acceptor added: [1] | Percent [2] |
|---|---|
| Control (one) | 67 |
| Melamine | 74 |
| Dimethoxy acetylene diurea | 74 |
| Triazone | 76 |
| Ethylene urea | 76 |
| Dicyandiamide | 76 |
| Levulinic acid hydantoin | 76 |
| Methyl acetylene diurea | 77 |
| Dimethyl hydantoin | 78 |
| Dihydroxy ethylene urea | 78 |
| Urea | 78 |

[1] One molar equivalent of NH groups per mole of NaOCl.
[2] Percent of whiteness (untreated fabric equals 8% whiteness), photovolt reflectance: MgO=100%.

The control showed a reflectance of 67% after the bleaching, due to the canary yellow color formed. The degree of yellowing was materially decreased in the presence of the chlorine acceptor. Whiteness in this test has a value of 80, so that it is evident how close the treated fabrics are to the norm, in contrast to the control. All of the compounds tested clearly minimized chlorine attack of the fabric during the bleaching.

EXAMPLE III

A series of experiments were carried out on the cotton fabric of Example II using varying amounts of acceptor per molar equivalent of NaOCl. The same test was used as in Example II, and the data obtained is reproduced in Table III below:

Table III

| Chlorine acceptor added, amount (molar equivalent of NH) | Compound | Percent whiteness [1] photovolt reflectance; MgO=100% |
|---|---|---|
| None | Control | 67 |
| 0.5 | Urea | 71 |
| 1.0 | do | 77 |
| 2.0 | do | 78 |
| 0.5 | Hydroxy ethylene urea | 78 |
| 1.0 | do | 78 |
| 2.0 | do | 78 |
| 0.5 | Methyl acetylene diurea | 72 |
| 1.0 | do | 77 |
| 2.0 | do | 78 |
| 0.5 | Levulinic acid hydantoin | 72 |
| 1.0 | do | 76 |
| 2.0 | do | 76 |
| 0.5 | Dimethyl hydantoin | 76 |
| 1.0 | do | 78 |
| 2.0 | do | 77 |
| 0.5 | Acetylene diurea | 69 |
| 1.0 | do | 77 |
| 2.0 | do | 77 |

[1] Untreated fabric = 80+.

It is apparent from the data above that approximately one mole of NH groups supplied by the acceptor per mole of NaOCl added is usually required for optimum inhibition. Each of the bleaching baths tested containing one or more molar equivalents of the acceptor per mole equivalent of NaOCl was quite effective in preventing the yellowing which would otherwise have been obtained, as evidenced by the control.

EXAMPLE IV

A group of experiments was carried out using a detergent washing solution which contained bleach, thus reproducing the home laundry washing cycle. The detergent used was commercially available, a built formulation composed of 18% alkyl aryl sulfonate of the Oronite type (sodium polypropylene benzene sulfonate, the polypropylene group having an average of 12 carbon atoms), 30% tetrasodium pyrophosphate, 15% sodium tripolyphosphate, 0.5% sodium carboxymethylcellulose, 6% sodium silicate, 3% sodium carbonate, and the balance sodium sulfate and miscellaneous inorganic salts and water. The washing formula was as given in Table IV below. The bleaching agent used was sodium hypochlorite (Clorox). An Easy automatic washing machine, Model ADG, was employed in this test, using a load of six pounds, a water temperature of 140° F. and a ten minute washing cycle.

The bath ratio was 10 to 1, and the total volume of the washing solution was from 8 to 9 gallons.

The whiteness was evaluated by a photoelectric reflection meter using a tri blue filter. In this meter magnesium oxide has a whiteness value of 100, which is used as the standard. The fabrics were artificially stained and then washed in the washing machine in an attempt to restore their original whiteness. The following results were obtained.

Table IV

| Washing formula | Percent whiteness | | |
|---|---|---|---|
| | Tea stain | Coffee stain | Orange stain |
| (1) Unwashed | 53 | 50 | 51 |
| (2) 1 cup [1] detergent | 73 | 70 | 76 |
| (3) 1 cup [1] detergent, 1 cup Clorox [2] | 82 | 82 | 82 |
| (4) 1 cup [1] detergent, 1 cup Clorox, [2] 9.6 gms. urea | 82 | 80 | 82 |
| (5) 1 cup [1] detergent, 1 cup Clorox, [2] 13.4 gms. melamine | 82 | 82 | 82 |

[1] 90 grams.  [2] 225 grams.

The improvement in whiteness by the combined bleaching and washing solution used is evident in this test. The presence of urea and melamine in the bleaching bath clearly does not destroy the bleaching efficiency of the hypochlorite, although it does minimize reduction in strength during the washing.

EXAMPLE V

A group of experiments was carried out using a detergent washing solution with and without bleach, thus reproducing the home laundry washing cycle, and with and without the chlorine acceptor. The detergent used was the commercially available built formulation of Example IV. The bleaching agent used was sodium hypochlorite (Clorox). The washing formulae were as given in Table V below. White cotton fabrics treated with a urea-formaldehyde resin were artificially soiled with black coffee, and then laundered. A Norge automatic home washing machine was employed in this test, using the normal setting for cottons at 140° F. The bath ratio was 10 to 1, and the total volume of the washing solution was from 8 to 9 gallons. The samples were then air dried, heated between plates at 400° F. for one minute, and the tensile strength then measured. Whiteness was evaluated as in Example IV. The following results were obtained:

Table V

| No. | Detergent, gms. | Clorox, gms. | Chlorine acceptor, gms. | Tensile strength, lbs. | Whiteness, percent |
|---|---|---|---|---|---|
| 1 | 90 | 0 | 0.00 urea | 42 | 77 |
| 2 | 90 | 225 | do | <15 | 85 |
| 3 | 90 | 225 | 1.19 urea | <15 | 86 |
| 4 | 90 | 225 | 2.38 urea | 16 | 85 |
| 5 | 90 | 225 | 4.76 urea | 18 | 86 |
| 6 | 90 | 225 | 7.14 urea | 35 | 82 |
| 7 | 90 | 225 | 9.60 urea | 31 | 80 |
| 8 | 90 | 225 | 19.20 urea | 37 | 82 |
| 9 | 90 | 225 | 0.00 melamine | <15 | 85 |
| 10 | 90 | 225 | 2.70 melamine | <15 | 85 |
| 11 | 90 | 225 | 5.40 melamine | <15 | 85 |
| 12 | 90 | 225 | 8.10 melamine | 33 | 82 |
| 13 | 90 | 225 | 10.80 melamine | 39 | 80 |
| 14 | 90 | 225 | 0.00 dimethyl hydantoin | <15 | 85 |
| 15 | 90 | 225 | 4.12 dimethyl hydantoin | 17 | 86 |
| 16 | 90 | 225 | 8.25 dimethyl hydantoin | 20 | 86 |
| 17 | 90 | 225 | 12.37 dimethyl hydantoin | 24 | 85 |
| 18 | 90 | 225 | 16.50 dimethyl hydantoin | 30 | 82 |
| 19 | 90 | 225 | 0.00 acetylene diurea | <15 | 85 |
| 20 | 90 | 225 | 2.28 acetylene diurea | 17 | 86 |
| 21 | 90 | 225 | 4.57 acetylene diurea | 16 | 82 |
| 22 | 90 | 225 | 6.85 acetylene diurea | 26 | 82 |
| 23 | 90 | 225 | 9.14 acetylene diurea | 26 | 78 |
| Control 1 | Unwashed coffee soiled fabric | | | 45 | 44 |
| Control 2 | Unwashed unsoiled fabric | | | 45 | 88 |

[1] Also Nos. 9, 14 and 19.

It is apparent from No. 2 [1] that the detergent alone affords no protection against the deteriorative effect of bleach. Quite large amounts of urea, melamine, dimethyl hydantoin and acetylene diurea are needed for protection, upwards of 7.5% for a noticeable effect (Nos. 6, 7, 11, 12, 16, 17, 22 and 23) and 10% or more for good protection (Nos. 8 and 13). The protection is obtained without appreciable loss in bleaching efficiency.

EXAMPLE VI

Samples of white nylon taffeta were washed in an automatic home washer, using 90 g. of the commercially available built detergent formulation of Example IV, and 225 g. of Clorox. At the end of the washing period, the nylon samples were bright yellow in color.

A second series of white nylon taffetas were washed with the same washing and bleaching formulation, to which was added 9.6 g. of urea. The nylon fabric in this case was bleached to pure white. No yellow discoloration was evident.

What is claimed is:

1. A process for bleaching textile materials comprising a polymeric material having in the molecule NH groups reactive with hypochlorite bleach to form N—Cl groups, which comprises subjecting the textile material to the bleaching action of an aqueous solution consisting essentially of a hypochlorite bleaching compound and an organic nitrogenous material having in the molecule at least one NH group reactive with hypochlorite to form an N—Cl group in an amount of at least 5% by weight of the bleach sufficient to inhibit formation by hypochlorite reaction of N—Cl groups on the polymer molecule.

2. A process in accordance with claim 1, in which the amount of organic nitrogenous compound is sufficient to supply NH groups in an amount within the range from about one to about five moles per mole of NH groups on the polymer molecule.

3. A process in accordance with claim 1, in which the organic nitrogenous compound comprises a linking nucleus whose valences are satisfied by Z and which is selected from the group consisting of:

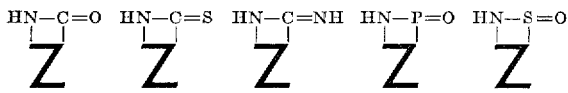

where Z is selected from the group of monovalent, bivalent and trivalent radicals consisting of hydrogen, alkyl, alkylene, aryl, amino and saturated and unsaturated mono and polynuclear alicyclic and heterocyclic rings condensed therewith having from about one to about thirty carbon atoms, and such groups bearing a substituent selected from the group consisting of hydroxyl, halogen, amino, alkyl and aryl groups.

4. A process in accordance with claim 1, in which the bleaching composition also comprises a detergent.

5. A process in accordance with claim 3, in which the organic nitrogenous compound is a urea.

6. A process in accordance with claim 3, in which the organic nitrogenous compound is a melamine.

7. A process in accordance with claim 3, in which the organic nitrogenous compound is an acetylene diurea.

8. A process in accordance with claim 3, in which the organic nitrogenous compound is a hydantoin.

9. A process in accordance with claim 3, in which the organic nitrogenous compound is a dicyanamide.

10. A process in accordance with claim 3, in which the organic nitrogenous compound is an amide.

11. A process in accordance with claim 4 in which the detergent is a soap.

12. A process in accordance with claim 4 in which the detergent is a synthetic detergent.

13. A bleaching composition consisting essentially of a hypochlorite bleaching compound and an organic nitrogenous material having in the molecule at least one NH group reactive with hypochlorite to form an N—Cl group, in an amount at least 5% by weight of the bleaching compound sufficient at a bleaching concentration of the hypochlorite bleaching compound to inhibit formation of N—Cl groups on polymer molecules adherent to textile materials bleached with the composition.

14. A bleaching composition in accordance with claim 13 in which the organic nitrogenous compound compound comprises a linking nucleus whose valences are satisfied by Z and which is selected from the group consisting of:

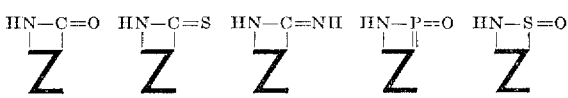

where Z is selected from the group of monovalent, bivalent and trivalent radicals consisting of hydrogen, alkyl, alkylene, aryl, amino and saturated and unsaturated mono and polynuclear alicyclic and heterocyclic rings condensed therewith having from about one to about thirty carbon atoms, and such groups bearing a substituent selected from the group consisting of hydroxyl, halogen, amino, alkyl and aryl groups.

15. A bleaching composition consisting essentially of a hypochlorite bleaching compound, a detergent and an organic nitrogenous material having in the molecule at least one NH group reactive with hypochlorite to form an N—Cl group, in an amount of at least 5% by weight of the bleaching compound sufficient at a bleaching concentration of the hypochlorite bleaching compound to inhibit formation of N—Cl groups on polymer molecules adherent to textile materials bleached with the composition.

16. A bleaching composition in accordance with claim 15, in which the detergent is a soap.

17. A bleaching composition in accordance with claim 15 in which the detergent is a synthetic detergent.

References Cited in the file of this patent

UNITED STATES PATENTS

| | | |
|---|---|---|
| 1,854,235 | Stoddard | Apr. 19, 1932 |
| 2,184,883 | Musket et al. | Dec. 26, 1939 |
| 2,327,323 | Teeters | Aug. 17, 1943 |
| 2,438,781 | Kamlet | Mar. 30, 1948 |
| 2,490,459 | Lilienfeld | Dec. 6, 1949 |
| 2,527,076 | Preston | Oct. 24, 1950 |
| 2,901,463 | Hurwitz | Aug. 25, 1959 |
| 2,938,764 | Blomfield | May 31, 1960 |

OTHER REFERENCES

Chenicek: "Active Clorine Compounds—Their Chemistry and Application," Textile Research Journal, vol 16, pp. 219–225 (May 1946).

UNITED STATES PATENT OFFICE
CERTIFICATE OF CORRECTION

Patent No. 3,099,625            July 30, 1963

Domenick D. Gagliardi et al.

It is hereby certified that error appears in the above numbered patent requiring correction and that the said Letters Patent should read as corrected below.

Column 6, line 50, for "N(β-hydrovyethyl-" read -- N(β-hydroxyethyl- --; column 9, footnote 1 to Table III, should appear as shown below instead of as in the patent:

$^{1}$Untreated fabric=80.

columns 9 and 10, Table V, second column, line 17 thereof, for ",90" read -- 90 --; column 11, lines 40 to 44, for

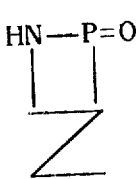    read    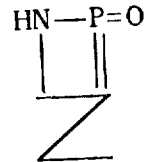

Signed and sealed this 5th day of May 1964.

(SEAL)
Attest:

ERNEST W. SWIDER
Attesting Officer

EDWARD J. BRENNER
Commissioner of Patents